United States Patent [19]

Fuzzell

[11] Patent Number: 4,670,715

[45] Date of Patent: Jun. 2, 1987

[54] FRICTIONALLY SUPPORTED GEAR TOOTH SENSOR WITH SELF-ADJUSTING AIR GAP

[75] Inventor: Joe E. Fuzzell, Tokyo, Japan

[73] Assignee: Caterpillar Inc., Peoria, Ill.

[21] Appl. No.: 855,986

[22] Filed: Apr. 24, 1986

Related U.S. Application Data

[63] Continuation-in-part of Ser. No. 461,904, Jan. 28, 1983, abandoned.

[51] Int. Cl.$^4$ .............................................. G01B 7/30
[52] U.S. Cl. ................................... 324/208; 324/174; 403/289
[58] Field of Search ............... 324/207, 208, 202, 173, 324/174, 175, 160, 166, 167, 168; 267/167, 9 R, 9 B; 403/375, 354, 109, 289; 123/601, 605, 617

[56] References Cited

U.S. PATENT DOCUMENTS

| | | | |
|---|---|---|---|
| 1,348,434 | 8/1920 | Marshick | 403/289 X |
| 2,101,346 | 12/1937 | Robertson | 308/184 |
| 2,154,275 | 4/1939 | Linn | 248/358 |
| 2,625,415 | 1/1953 | Smith | 403/289 |
| 2,801,700 | 8/1957 | Hall, Sr. | 166/243 |
| 3,276,760 | 10/1966 | Last et al. | 267/1 |
| 3,323,785 | 6/1967 | Mather | 267/1 |
| 3,468,527 | 9/1969 | Mather | 267/1 |
| 3,719,378 | 3/1973 | Windsor | 403/354 X |
| 3,732,494 | 5/1973 | Dragon | 324/173 |
| 3,772,548 | 11/1973 | Wroblewski | 310/168 |
| 3,793,545 | 2/1974 | Leiber et al. | 310/168 |
| 3,910,566 | 10/1975 | Pedersen et al. | 267/167 |
| 3,942,112 | 3/1976 | Westbrook | 324/166 |
| 4,024,458 | 5/1977 | Templin | 328/133 |
| 4,045,738 | 8/1977 | Buzzell | 324/174 |
| 4,107,561 | 8/1978 | Schmidt | 310/95 |
| 4,262,251 | 4/1981 | Fujishiro | 324/208 |
| 4,302,724 | 11/1981 | Grover et al. | 324/402 |
| 4,331,917 | 5/1982 | Render et al. | 324/166 |
| 4,384,252 | 5/1983 | Kolter | 324/239 |
| 4,401,946 | 8/1983 | Klimstra | 324/208 |

FOREIGN PATENT DOCUMENTS

| | | | |
|---|---|---|---|
| 2548773 | 5/1977 | Fed. Rep. of Germany | |
| 1011626 | 6/1952 | France | 267/167 |
| 2128827 | 10/1972 | France | |
| 2287700 | 7/1976 | France | |
| 674720 | 6/1952 | United Kingdom | 267/167 |

Primary Examiner—Reinhard J. Eisenzopf
Assistant Examiner—Warren S. Edmonds
Attorney, Agent, or Firm—Terry D. Morgan

[57] ABSTRACT

An electronic sensor apparatus for determining motion of a movable element has a sensor housing for accurately positioning the sensor at a preselected distance from the movable element in response to contact with the movable element. A holding means maintains the sensor housing at the desired position. Heretofore, similar sensing systems have employed the use of customized sensor bodies or manually inserted shims to establish the sensing system at its required location.

8 Claims, 2 Drawing Figures

FRICTIONALLY SUPPORTED GEAR TOOTH SENSOR WITH SELF-ADJUSTING AIR GAP

CROSS-REFERENCE TO RELATED APPLICATIONS

This application is a continuation-in-part of application Ser. No. 461,904 filed by Joe E. Fuzzell on Jan. 28, 1983, now abandoned.

DESCRIPTION

1. Technical Field

This invention relates generally to electronic sensors for determining the velocity, angular position, or direction of motion of a driven element and more particularly to an apparatus for adjusting the gap between the electronic sensor and the driven element.

2. Background Art

Electronic sensors for determining the velocity, angular position, or direction of motion of a driven element, such as a gear, are well-known in the art, as evidenced by U.S. Pat. Nos. 4,045,738 issued to Buzzell on Sept. 8, 1977; 4,262,251 issued to Fujishiro et al. on Apr. 14, 1981, and 4,331,917 issued to Render on May 25, 1982. Each of these patents employs a similar sensing device for producing a pulse train representative of the gear teeth moving past the sensor. All of the sensors rely on a change in flux density induced by the gear teeth and this change in flux density is influenced greatly by the air gap present between the gear tooth and the sensor. Consequently, each of the three, and furthermore, all similar sensors, suffer from this inherent disadvantage. It is, therefore, necessary to minimize the air gap to obtain a pulse train of a sufficient magnitude. None of the prior art addresses the problem of obtaining a minimum air gap in a variety of different applications without the use of either shims or customized sensor bodies and all require very exacting torques, making assembly a difficult and error prone procedure.

The present invention is directed to overcoming one or more of the problems as set forth above.

DISCLOSURE OF THE INVENTION

In accordance with one aspect of the present invention, a sensing apparatus, adapted for mounting adjacent a movable element, has an electronic sensor and means for adjusting the position of the electronic sensor relative to the movable member in response to contact of the sensing apparatus with the movable member.

The prior art makes no attempt to provide a generic sensor body responsive to different air gaps present in different applications. The present invention directs itself to providing a single sensor functional in a wide variety of applications by adjusting the position of the electronic sensor in response to contacting the movable member. The mounting of the sensing apparatus is also greatly simplified, thereby reducing the probability of error during assembly.

BEST MODE FOR CARRYING OUT THE INVENTION

Figure 1:
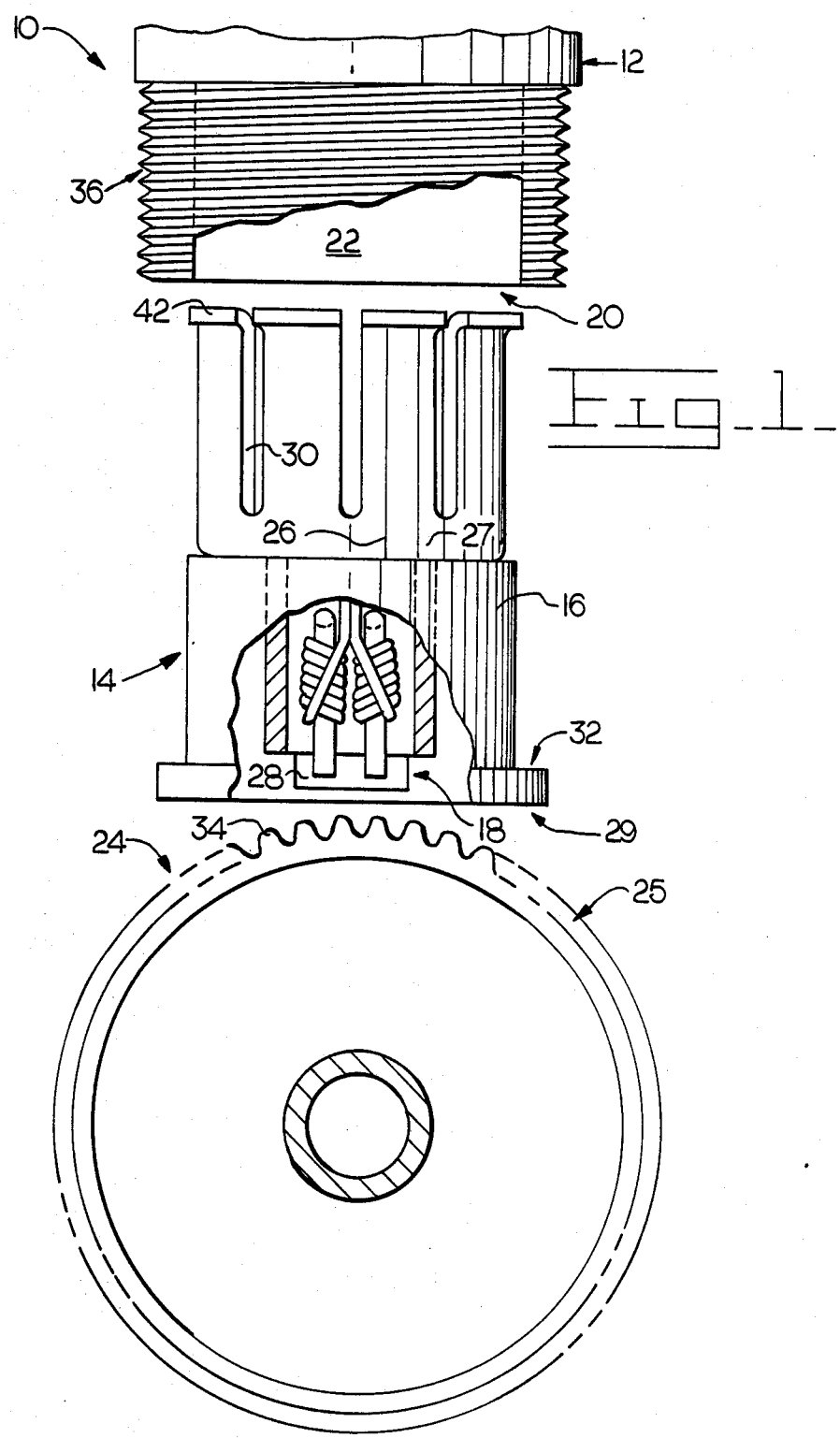
FIG. 1 is a schematic drawing of a first embodiment of the sensing apparatus.

Referring to FIG. 1, a sensing apparatus 10 is adapted for mounting adjacent a movable element 24, shown to be a gear 25 for ease of illustration, and is comprised of a first body 12 and a second body 14. The first body 12 additionally has an opening 20 and an opening inner surface 22. The second body 14 is comprised of a sensor housing 16 associated with the electronic sensor 18 and a holding means 26 (which is described in detail later in the specification). The second body 14 is adapted for positioning and moving within the opening 20 of the first body 12. The sensor housing 16 is positionable to a preselected location relative to the movable element 24 in response to contact with the movable element 24. The holding means 26 is provided for maintaining the sensor housing 16 at this preselected location.

The holding means 26 is a unitary segmented spring 27 comprised of a hollow cylindrical body with a flanged portion 42 adjacent one end and slots 30 extending substantially the length of the cylinder. The unitary segmented spring 27 provides a frictional force by the flanged portion 42 contacting the opening inner surface 22 of the first body 12. By compressing the unitary segmented spring 27, the second body 14 can be inserted into the opening 20 of the first body 12. The unitary segmented spring 27 will expand, thus contacting the opening inner surface 22, thereby acting as a frictional device to prevent undesirable movement of the sensor housing 16. The unitary segmented spring 27 maintains the position of the second body 14 until a force adequate to overcome the frictional coefficient of the unitary segmented spring 27 is applied to the sensor housing 16. The frictional coefficient should be sufficient to prevent undesirable movement of the second body 14 caused by vibrational forces experienced in the most severe applications.

Means 36 for mounting the first body 12 and positioning the sensor housing 14 within the pathway of the movable element 24 is shown to be a threaded portion of the body 12, but it is recognized by those skilled in the art that any means for mounting the apparatus 10 (i.e., press fit, weld, etc.) would be considered equivalent.

The sensor housing 16 is comprised essentially of a hollow cylindrical body formed from any of a variety of materials, preferably organic plastic. The body is hollow to accept the electronic sensor 18 within the sensor housing 16 adjacent a first end 29 nearest the movable element 24. A repositioning flange 32, which is greater in diameter than the inner opening 20 diameter, permits the second body 14 to be repositioned easily and prevents total entry of the second body 14 into the first body 12. In this embodiment of the invention, the electronic sensor 18 is a Hall effect device 28, but the invention is not directed toward the type of electronic sensor 18 and any type of sensor capable of detecting speed, direction, or angle of motion could be readily substituted for the Hall effect device 28 shown here and not depart from the scope of the intended invention.

Figure 2:
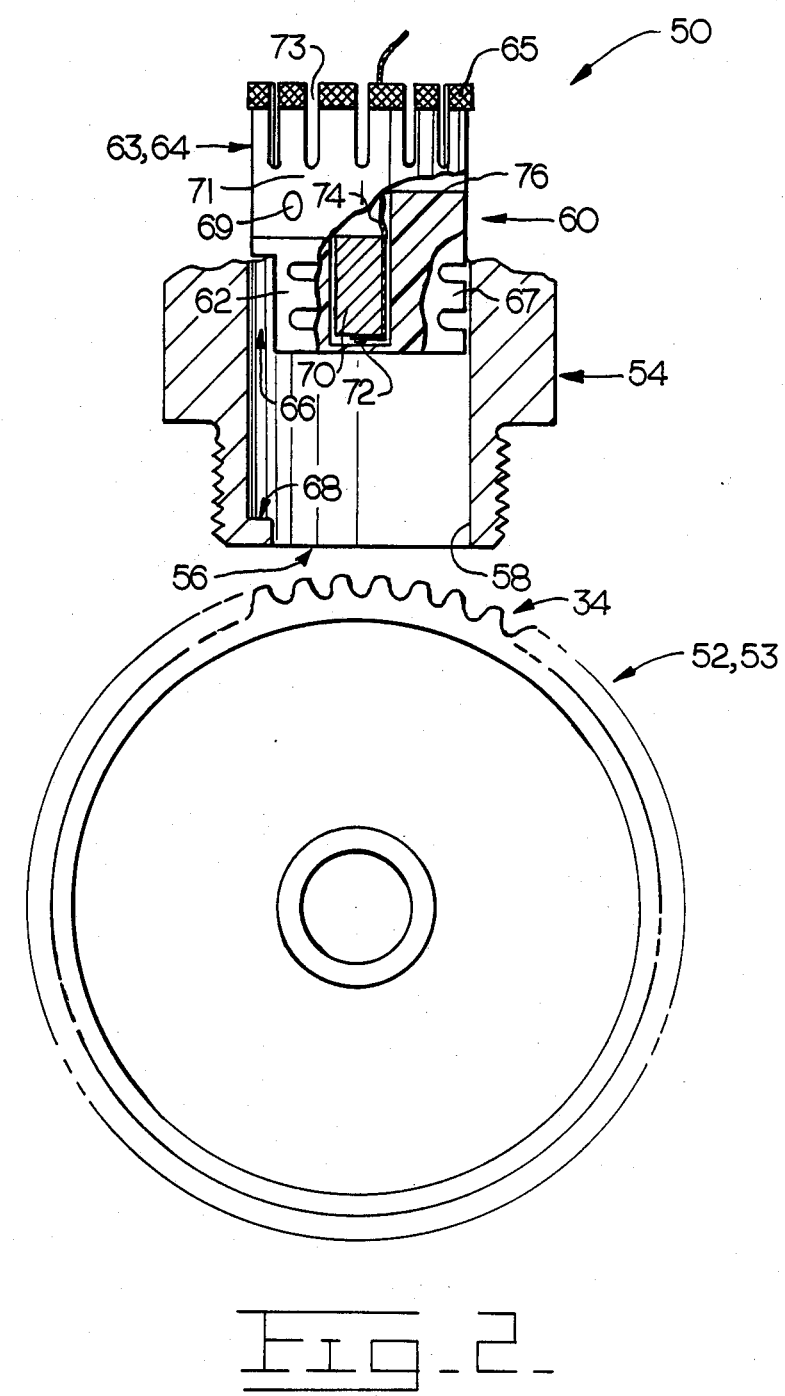
FIG. 2 is a schematic drawing of a second embodiment of the sensing apparatus.

Referring to FIG. 2, a sensing apparatus 50, adaptable for mounting adjacent a movable element 52, is shown to be a gear 53. The apparatus 50 is comprised of a first body 54, having an opening 56 and an opening inner surface 58, and a second body 60 having a sensor housing 62 and a holding means 63. The second body 60 is adapted for movement and positionability within the opening 56 of the first body 54. The holding means 63 is a unitary segmented spring 64 which is comprised of a hollow cylindrical body 71 with a knurled portion 65, the outer diameter of which is greater than the outer diameter of the cylinder 71, and slots 73 extending substantially the length of the cylinder 71. This device is equivalent to the unitary segmented spring 27 shown in FIG. 1, as can be seen from its similar function and structure. It is important to note that the outer diameter of the knurled portion 65 of the unitary segmented spring 64 is also greater than the inner diameter of the inner opening 56 of the first body 54. The sensor housing 62 is essentially the same as described for FIG. 1 with minor functional changes. The sensor housing has a keyway 66 which corresponds to a keyway notch 68 in the end of the first body 54 adjacent the movable element 52. This complimentary keyway and notch arrangement prevents annular rotation of the second body 60. In addition, the repositioning flanges 67 are not greater in diameter than the inner opening surface diameter of the first body 54 in order to allow entry of the second body 60 into the end of the first body 54 not adjacent the movable element 52. The sensor housing 62 must be affixed to the unitary segmented spring 64. If made from an organic plastic, the sensor housing 62 may be bonded to the spring 64 by filling a hole 69 in the spring 64 with the plastic. Other means may be adopted for joining the two parts, including a single body construction, while not departing from the scope of the invention.

By compressing the spring 64, the second body 60 may be inserted into the end of the first body 54 furthest from the movable element 52. The second body 60 is positioned in the first body 54 by contacting the gear 53, in the following manner. Once the second body 60 has been inserted to its maximum position inside the first body 54, the gear 53 upon rotation contacts the sensor housing 62, thus pushing the second body 60 back into the first body 54. As the gear 53 completes a full rotation, it positions the sensor housing 62 at the minimum air gap, which is equal to the run out of the gear 53. Frictional force provided by the knurled portion 65 contacting the opening inner surface 58 of the first body 54 substantially prevents longitudinal movement of the second body 60 inside the first body 54 and maintains sensor housing 62 position. The contents of the sensor housing 62 are shown to be a magnet 70 biasing a Hall Cell 72, which is mounted on a flexible PC board 74. Again, this is the preferred embodiment and any sensor capable of detecting speed, direction, or angle of motion could be used in the sensor housing 62.

In addition, the second body 60 is compatible with the use of potting compound. After the chosen sensor has been placed in the sensor housing 62, potting compound may be poured into the second body 60 up to surface 76. This is usually performed to protect the sensor from moisture and vibration and also as a mounting method.

Industrial Applicability

At the time the sensing apparatus 10 is to be installed, the sensor housing 16 should extend at least a sufficient distance to contact the gear teeth 34 when the apparatus 10 is fully installed. As the first body 12 is threaded into its mounting, the sensor housing 16 will contact the gear teeth 34 and be forced further into the opening 20. Installation of the apparatus 10 is complete once the first body 12 has been adequately tightened to prevent loosening during severe vibratory periods.

The mechanics of installing the sensing apparatus 10 are essentially complete and positioning of the electronic sensor 18 to obtain a minimum air gap is automatically accomplished during normal operation.

During the initial operating period, motion of the gear 25 causes contact between the sensor housing 16 and the gear teeth 34, resulting in the second body 14 being forced into the opening 20 of the first body 12 to a preselected position. In this way, the air gap between the sensor housing 16 and the gear teeth 34 is equal to the run out of the gear 25, which is the minimum attainable air gap. The unitary segmented spring 27 will continue to hold the second body 14 at this preselected or minimum air gap position under the most severe applications.

If at any time it becomes necessary to remove the sensing apparatus 10, reinstalling the device is easily accomplished even under adverse field conditions. The same minimum air gap can be obtained by prying on the flanged portion 40 of the sensor housing 16 to restore the second body 14 to the extended position and then reinserting the apparatus 10 into its mounting. The minimum air gap is once again established during normal operation.

As evidenced by the preceeding description, the sensing apparatus 10 provides a desirable function lacking in the prior art. The ability to obtain a minimum air gap from a single generic sensor body is economically advantageous as well as important in that it greatly simplifies installation of the apparatus 10 and reduces the waste of materials, labor, and time.

Other aspects, objects, and advantages of this invention can be obtained from a study of the drawings, the disclosure, and the appended claims.

I claim:

1. An apparatus for detecting a change in flux density of an air gap defined between a movable element having a plurality of radial protrusions and the apparatus, said apparatus comprising:

a first body having an opening of a first preselected diameter and an opening inner surface;

a second body having a generally cylindrical configuration of a second preselected diameter having a magnitude less than the first preselected diameter, the second body being slidably movable within the opening in a direction radially outward from said movable element in response to contact with said radial protrusions of the movable element;

a holding means for providing a substantial frictional force between the second body and the opening inner surface and maintaining the second body at a preselected location, the holding means having a generally cylindrical body, first and second end portions, and a plurality of slots extending from the first end portion through the second end portion, the first end portion of the cylindrical body being connected to the second body, the second end portion having a diameter greater than both the first end portion diameter and said first preselected diameter and being compressibly contactable with the first body opening inner surface; and a magnetic flux sensitive electronic sensor disposed within the second body.

2. The apparatus, as set forth in claim 1, wherein said second end portion of said holding means has a flanged portion extending radially outward and defining a third preselected diameter having a magnitude greater than the first preselected diameter.

3. The apparatus, as set forth in claim 1, wherein said electronic sensor includes a Hall effect device.

4. The apparatus, as set forth in claim 1, wherein said second body is formed of an organic plastic.

5. The apparatus, as set forth in claim 1, wherein said flanged portion of said holding means has knurling on the surface of said third preselected diameter.

6. The apparatus, as set forth in claim 5, wherein said first and second body includes a complementary keyway and keyway notch.

7. The apparatus, as set forth in claim 5, wherein said second body includes at least one repositioning flange having an outer diameter substantially equal to said second preselected diameter and an inner diameter less than the second preselected diameter.

8. An apparatus for detecting a change in flux density of an air gap defined between a movable element having a plurality of radial protrusions and the apparatus, said apparatus comprising:
 a body having an opening of a first preselected diameter, an opening inner surface, and a keyway notch;
 a sensor housing formed of an organic plastic, having a generally cylindrical configuration of a second preselected diameter having a magnitude less than the first preselected diameter, the sensor housing being slidably movable within the opening in a direction radially outward from said movable element in response to contact with said radial protrusions of the movable element and having a keyway complimentary with the keyway notch of the body and having at least one repositioning flange, the outer diameter being substantially equal to the second preselected diameter;
 a unitary segmented spring having a generally hollow cylindrical body, first and second end portions, and a plurality of slots extending from the first end portion through the second end portion, the first end portion of the cylindrical body being connected to the sensor housing, the second end portion having a third preselected diameter greater than both the first end portion diameter and said first preselected diameter and being compressibly contactable with the first body opening inner surface, the surface of the third preselected diameter being knurled, whereby said unitary segmented spring provides a substantial frictional force between the sensor housing and the opening inner surface and maintains the sensor housing at a preselected location;
 a magnet disposed within the sensor housing; and
 a Hall effect device disposed between the magnet and the movable element within the sensor housing.

* * * * *